United States Patent [19]
Guichet

[11] 3,808,688
[45] May 7, 1974

[54] CENTRIC RELATING DEVICE AND INSPECTION MEANS

[76] Inventor: Niles F. Guichet, 320 Olympia Pl., Anaheim, Calif. 92806

[22] Filed: July 24, 1972

[21] Appl. No.: 274,573

Related U.S. Application Data

[63] Continuation-in-part of Ser. No. 166,187, July 26, 1971, Pat. No. 3,750,289.

[52] U.S. Cl. ................................................. 32/32
[51] Int. Cl. .......................................... A61c 11/00
[58] Field of Search .................................... 32/32

[56] References Cited
UNITED STATES PATENTS
2,613,440  10/1952  Murray et al. ........................ 32/32
2,608,762  9/1952  Fox ....................................... 32/32

*Primary Examiner*—Robert Peshock
*Attorney, Agent, or Firm*—Robert E. Strauss

[57] ABSTRACT

A device is described which can be used to orient dental casts in a precise centric occlusion. The device comprises upper and lower frames that have dental cast support means and that are hinged together in a joint along the condylar axis. The joint permits only pivotable movement of the members in a medial plane. One of the frames, preferably the lower, has centering pivot pins that seat in mating recesses in the joint component of the other frame. The centric relating device is maintained in a precise alignment by use of a centric inspection means. The centric inspection means comprises a pair of blocks, one of which bears at least one index mark with a calibrated field to observe any angular component of misalignment of the frames. The device is also provided with indicating means at either side of the blocks to indicate any vertical component of misalignment of the frames. The inspection means can also be used to check the alignment of a dental articulator. The centric relating device is used to mount dental casts to their support rings while using check bite means to orient the casts in the exact anatomical relationship.

11 Claims, 5 Drawing Figures

PATENTED MAY 7 1974 3,808,688
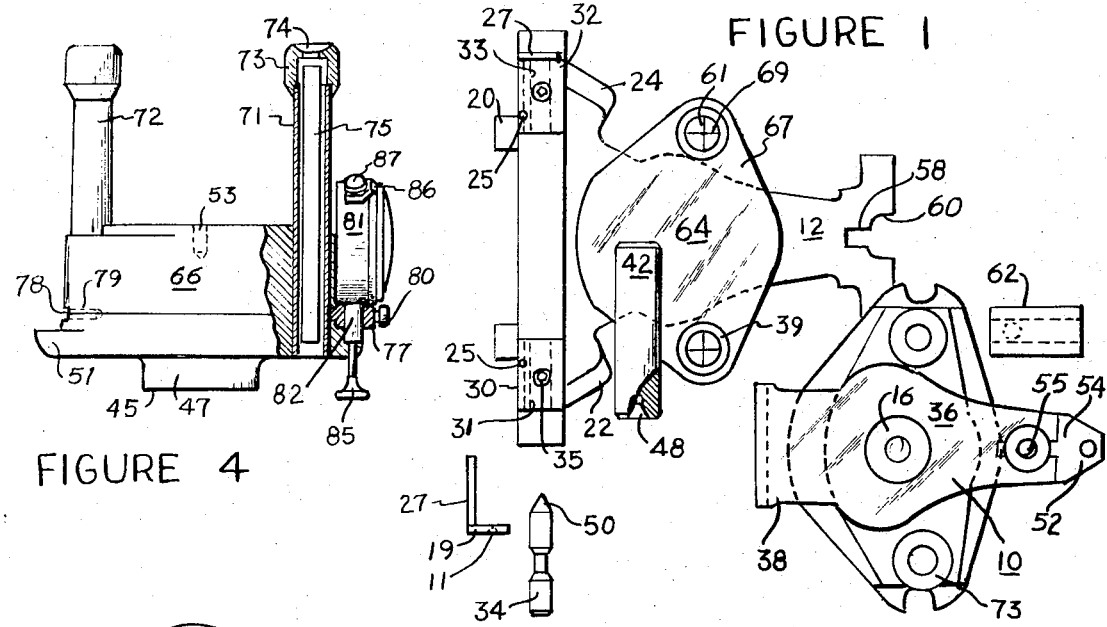
FIGURE 1
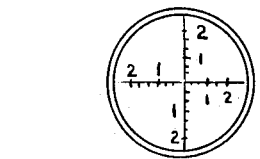
FIGURE 5
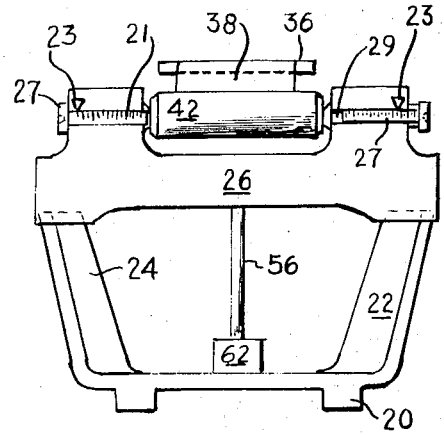
FIGURE 3
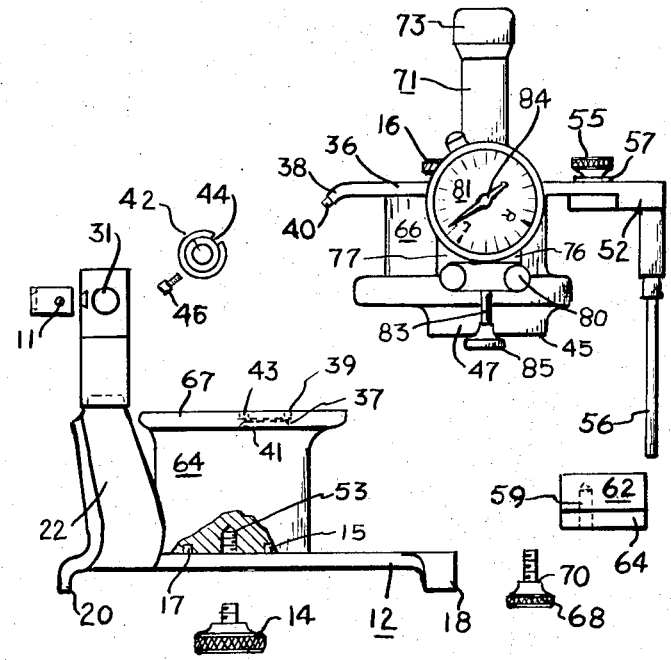
FIGURE 4
FIGURE 2

CENTRIC RELATING DEVICE AND INSPECTION MEANS

This application is a continuation-in-part of my prior, copending application, Ser. No. 166,187, filed July 26, 1971 and now U.S. Pat. No. 3,750,289 issued Aug. 7, 1973.

Recent advances in dental articulators have resulted in devices which provide a maximum number of adjustable movements to permit faithfull duplication of the eccentric or border movements of a mandible. The dental articulators comprise upper and lower frames that are hinged together at their rear ends with mechanical fossa joints that simulate the fossa-condyle joint of a mandible. The recent articulators achieve a maximum degree of adjustability by fossa guides such as independently adjustable rear wall, superior wall and medial wall guides. Provision for entirely lateral shifting is also present in some of these articulators.

All these independently adjustable guides, while essential in permitting duplication of the border movements of a mandible, compromise the precision in the centric orientation of dental casts when they are mounted in the articulator. The settings of the individual guides have tolerances and the centric orientation of the casts can be altered by the cummulative effect of these tolerances. To illustrate, a tolerance of 0.05 millimeters in setting of the immediate side shift adjustment of the medial wall guides is additive with a tolerance of 0.5 degrees in the angular adjustment of the medial wall guides.

In the design of a useful articulator, some compromise is also made in the rigidity of the frame members and in their assembly. Consequently, users of an articulator who apply excessive force on the lock screws of the articulator's adjustable members can force the frames of the articulator slightly out of a precise centric relationship. The degree of this alteration need only be slight to cause difficulties in the centric fit of the prosthetic devices which are prepared on the instrument.

The recognition that each articulator may have a slightly different centric registration of dental casts mounted therein has resulted in a laboratory practice to retain dental casts on a single articulator throughout the entire preparation of the dental appliance. While this avoids the introduction of errors in the appliance, it ties up an articulator for each case that is prepared in the laboratory and requires an almost prohibitive expenditure for articulators.

It is, therefore, an object of this invention to provide a device that can position dental casts in a precise centric relationship.

It is also an object to provide such a device with inspection means to insure that its frame members are in precise centric alignment.

It is a further object of this invention to provide inspection means for rapid and precise checking of the alignment of a dental articulator.

Other and related objects will be apparent from the following description of the invention.

The first of the preceding objects is achieved by the centric relating device of this invention which is formed of upper and lower frames that are hinged together at their posterior along the condylar axis by a mechanical joint that permits only pivotable movement of the members in the medial plane. Preferably the joint has rugged means to retain precision of the alignment of the frames during their use. To insure the accuracy of the centric relating device, it is supplied in combination with a centric inspection means of the invention which comprises indexing members that can be detachably secured to the frames of the centric relating device. These members have precisely oriented calibration means to permit simple observation of any mis alignment of the upper and lower frames of the centric relating device. The centric inspection means can also be used independently of the centric relating device as a means to check the alignment of a conventional dental articulator by determining if the frames of the articulator are in mis alignment when placed in the centric position.

The centric relating device can be used to orient the dental casts to a precise centric occlusion. The upper dental cast can be secured to its mounting ring in an articulator or in the centric relating device. The centric relating device has condyle mounting brackets to permit the transfer of a dental cast from a pantograph or a dental face bow. With the upper cast attached to the upper frame of the centric relating device of this invention, a mounting ring for the lower cast can be secured to the lower frame of the centric relating device and the lower cast can then be cemented or plastered to this ring, using check bite means to orient the lower cast to the upper cast. The resultant casts are precisely in centric orientation since no errors are introduced by the instrument. Thereafter the casts can be transferred to a remote centric relating device and have the same orientation to each other as they had when mounted in the original centric relating device.

The invention will now be described by reference to the FIGURES, of which:

FIG. 1 is an exploded plan view of the centric relating device and its centric inspection means;

FIG. 2 is a side view of the device of FIG. 1;

FIG. 3 is a rear view of the centric relating device;

FIG. 4 is a rear view of the upper half of the centric inspection means; and

FIG. 5 illustrates the field of view through an eyepiece of the centric inspection means.

Referring now to FIGS. 1 and 2, the centric relating device comprises an upper frame 10 and a lower frame 12 which are hinged together along the condylar axis by a joint which permits relative movement only by rotation in a medial plane. Each frame carries, at its midportion, means for removably securing a dental cast mounting ring. These means comprise thumb screws 14 and 16 which are inserted through bores in the frames and which bear threaded studs that engage the cast mounts. The frames also bear lugs such as 15 and 17 which are shown on the lower frame 12 and which mate with apertures or recesses in the cast mounting rings or other appliances such as the centric inspection means which are shown on the frames in FIGS. 1 and 2. The combination of the thumb screws and the lugs insures precise alignment of the dental casts or other apparatus on the frames.

The lower frame 12 is stamped from sheet metal with feet 18 at its anterior end and feet 20 at its posterior end. Outboard wings at the posterior of the stamping are bent upwardly to form upright support means 22 and 24. A cross bar 26 is mounted between the supports 22 and 24 with the upper ends of these supports fitted into grooves which are milled into the cross bar 26. The cross bar carries upright posts 30 and 32 at its opposite ends; preferably these are integral with the bar. The posts are bored at 31 and 33 with a diameter to fit bearing pins 34, and are tapped to receive set screws 35 which are used to lock pins 34 in bores 31.

The centric relating means bears a pair of sliding brackets on its rear surface. These can be seen at the rear view of the centric relating device, FIG. 3. The brackets 27 are mounted in dovetailed grooves 29 that are milled into the rear surface of posts 30 and 32. A set screw 25 can be provided in a tapped bore in the top of the posts to intersect the groove 29 so that the brackets can be locked at any extension along the grooves 29. An index mark 23 is provided on the posts to register the lateral extension of the brackets on scales 21 which are calibrated on the rear slide of the brackets. The brackets bear an outboard wing 19 which has an indentation 11 on the hinge axis of the device to permit mounting of centric pins of a face bow or pantograph.

The scale 21 is calibrated to correspond to varied intercondylar distances from 50 to about 70 millimeters. These brackets permit the centric relator to be used to mount the upper dental cast directly from the facebow or pantograph. This can be accomplished by sliding the brackets 27 outwardly until they engage the hinge axis centering pins of a face bow on which is supported a dental cast of the upper teeth. The centering pins are then hooked into the indentations 11 and the anterior of the face bow is supported at the correct vertical spacing in the customary manner. The upper cast can then be plastered to its mounting ring which is secured to the upper frame 10 of the centric relating device. The lower cast can then be plastered to the lower mounting ring which is secured to the lower frame 12. This is accomplished by plastering the lower cast to its mounting ring using conventional check bites of wax and the like to orient the cast to each other.

The upper frame is formed of plate 36 which has its posterior end rolled downwardly to form a lip 38 which also bears index means such as key 40 along its rear face. The joint component of the upper frame comprises shaft 42 which has keyway means such as groove 44 to seat key 40 for precise alignment of plate 36 thereto. Screws 46 can be used to fasten the plate to the shaft. The shaft is of the proper length for mounting between the inside faces of posts 30 and 32; see FIG. 3; and has tapered recesses 48 milled into its opposite ends. The pins 34 have tapered ends 50 that mate with these recesses so that the shaft 42 can be precisely oriented along the condyle axis of the instrument, i.e., the centerline passing through bores 31 and 33. Alternatively, pins 34 can be straight and bores 31 and 33 can be slightly oversized. Several threaded bores can be tapped into posts 30 and 32 transverse to bores 31 and 33 and set screws can be set therein. Pins 34 can then be moved into exact alignment with the set screws which can thereafter be permanently sealed in place by covering with a potting compound.

Plate 36 is slotted at 54 and block 52 is mounted therein with thumb screw 55 which can be tightened against washer 57 to bind the block in slot 54. This block is bored and fitted with incisal pin 56. The anterior of lower frame 12 is slotted at 58 and 60. A block 62, which comprises rest means for incisal pin 56, is milled with key means 64 that mates with the slot 58 of frame 12. The block is also bored and tapped at 59 to receive thumb screw 68. The thumb screw can be tightened to compress the upper face of its boss 70 against frame 12 and thus lock the block in the slot.

The centric inspection means has an optical viewer to permit observation of any horizontal components of the misalignment of frames 10 and 12. This inspection means comprises a pair of blocks 64 and 66 which can be removably attached to the lower and upper frames, respectively, of the centric relating device. The blocks can also be used with a conventional articulator to check its centric relationship. The blocks are bored and tapped such as at 53 to permit them to be attached to the upper frame 10 and to the lower frame 12 by thumb screws 14 and 16. The blocks also bear recesses or bores to mate with lugs such as 15 and 17 shown on the lower frame 12. The lower block 64 has an upper face or table 67 which bears, at either side thereof, index marks such as crossed lines shown at 61 and 69. The crossed lines are in a viewing stage directly beneath each of the microscopes carried by the upper block 66. The stages are formed by bores 41 through the outboard wings of the lower block 64 which are then counterbored from the top at 43 with a slightly oversized bit to form a shoulder 37 shown in FIG. 2. A thin glass or other transparent member with lines 61 and 69 on its surface is placed on the shoulder 37 and a retaining ring 39 is then cemented over the glass to hold it in place.

The upper portion or member of the centric inspection means is shown in FIG. 4 by itself and also in FIGS. 1 and 2 in combination with the centric relating means. Referring now to FIGS. 1 and 2, the upper member is formed of block 66 and is shown as it is attached to the upper frame 10 with thumb screw 16. The upper block 66 has a central portion with ribs 63 and 65 at its rear and front surfaces, respectively. The sides of the central portion are flat and each bears a keyway 78 shown at the left of FIG. 4. Two tapped bores 79 are placed in the keyway 78. The outboard sides of block 66 bear flat flanges 51 which have a central notch 49. The under portion of block 66 projects from the block as a boss 47 with an under surface 45 that bears against upper surface 67 of the lower block 64.

The upper block 66 supports optical viewing means such as microscopes 71 and 72 at opposite sides of the block 66. Each microscope comprises an eye pieces 73 with its lens 74 and a magnifying lens which is supported in tube 75. Suitable magnification which can be achieved by any conventional lens system can be from 10X to about 100X, preferably about 40X. Tubes 71 and 72 are fitted into bores in block 66. The viewing means also has a calibrated field such as that shown in FIG. 5 with scales that are calibrated in suitable subdivisions such as lines representing about 0.001 inch. These will register with crossed lines 61 and 69 to indicate the magitude of any horizontal components of the misalignment of either side of the centric relating device.

Means are also provided to register any vertical components of misalignment of the frames 10 and 12 of the centric relating device. This comprises gauge assembly 76 which is shown in FIGS. 2 and 4. The gauge assembly can be mounted at either side of block 66 and for this mounting has a base 77 which has a key that seats in keyway 78 on each of the flat sides of block 66. The base 77 is bored at its opposite ends and thumb screws 80 are placed in these bores and project into threaded engagement with bores 79 in block 66 so that the base can be removably attached in a precise orientation to either side of block 66.

Base 77 also supports dial gauge 81. The base has a central bore and the sleeve extension 82 of the gauge is seated in the bore and secured therein with a press fit, soldered or cemented connection. Dial gauge 81 is a conventional thickness gauge which has a spring biased lever 83 that is connected in a driving relationship to pointer 84 to register the vertical displacement of lever 83. A foot 85 can be placed on the end of lever 83 to insure that the lever will seat on the upper surface 67 of block 64.

The dial of gauge 81 is calibrated in suitable subdivisions, e.g., in thousands of an inch and the dial face can be rotated to move the zero reference point to any position and thereby calibrate the instrument. To this end, clamp means comprising bracket 86 is provided on the peripheral edge of the gauge with screw 87 that can be tightened to bear bracket 86 against the edge of the dial face and lock it against rotation. The foot 85 of the gauge 81 is shown projecting beneath the lower face of block 66 since, in the illustrated view, it is unrestrained and the internal spring of the gauge therefor fully extends lever 83. When the centric relating device is fully assembled as shown in FIG. 3 and when the gauge blocks 64 and 66 are mounted thereon, closing of the centric relating device's frames will cause foot 85 to bear against the surface 67 of block 64. This will move pointer 84 to register the vertical alignment of the blocks. A calibration mark can be placed on the dial for the left side of the instrument at the factory and any deviation that is subsequently observed from this calibration mark will indicate misalignment of the centric relating device. The gauge assembly 76 can then be removed and placed on the opposite side of the block 66. A second calibration mark can be placed on the dial for the right side of the instrument at the factory and deviations from this mark will indicate the degree of subsequent misalignment. Typical marks are shown in FIG. 2 as L and R on the face of the dial.

The centric inspection means can also be used on any dental articulator to check the alignment of its upper and lower frames. These articulators have frames similar to 10 and 12 of the centric relating device but have a hinge joint that permits their right and left lateral movement and a forward sliding (protrusive) movement. The frames of such articulators have dental cast mounting screws such as 14 and 16 and suitable blocks such as 64 and 66 can therefore be attached to a mid portion of the articulator frames. A set of blocks can be provided for any make and model of articulator which can then be calibrated with the blocks and, thereafter, periodic inspection can be made to determine if any misalignment has occured.

The invention has been described with reference to a presently preferred mode of practice thereof which is presented in the illustrations of the invention. It is not intended that this description and illustration of the preferred mode of practice be unduly limiting of the invention. Instead, it is intended that the invention be defined by the means and their obvious equivalents set forth in the following claims.

I claim:

1. Precision inspection means for the inspection of a dental apparatus having upper and lower frames hinged together along their condylar axis at their posteriors and bearing incisal pin and incisal pin rest means at their anteriors and attachment means to support dental casts at their mid-portions, which inspection means comprises a pair of mating index members having means to permit their removable attachment to said upper and lower frames of said dental apparatus by said attachment means, precise orientation means carried on each of said members comprising recesses to mate with said attachment means of each of said frames whereby said members can be precisely and fixedly oriented to said frames, the one of said members to be attached to said lower frame having a flat upper surface with at least one index mark thereon and the other of said members bearing magnification means opposite said mark with a calibrated field of vision whereby the degree of eccentricity of said frames of said dental apparatus can be observed.

2. The precision inspection means of claim 1 wherein the index member for attachment to the lower frame has an upper flat surface with laterally extending wings, an index mark at an outboard position on the wing area of said surface, and said second index member bears a magnification means at each side thereof and superimposed on said index marks.

3. The precision inspection means of claim 1 in combination with means supported at the opposite sides of at least one of said members to register any vertical components of misalignment of said frames of said dental apparatus.

4. The precision inspection means of claim 3 wherein said means to register vertical components of misalignment is a surface gauge having a dial indicator and actuating lever means with means to mount said gauge to the side of the index member to be secured to said upper frame with said lever means projecting into engagement with said upper flat surface of the other of said members.

5. The combination of the precision inspection means of claim 1 with a dental apparatus which is a centric relating device having upper and lower frames hinged together at their posteriors by joint means which permits relative movement of the frames by rotation only in the medial plane.

6. The combination of claim 5 wherein said joint means is positioned on the condylar axis of said apparatus.

7. The combination of claim 6 wherein said joint means comprises a pair of pins which are supported by one of said frames and which project into mating recesses carried by the other of said frames.

8. The combination of claim 7 wherein the other of said frames supports a shaft on the condylar axis of the apparatus and said mating recesses are in the opposite ends of said shaft.

9. The combination of claim 5 wherein the lower of said frames carries brackets, one each slidably mounted on each side thereof and bearing a forwardly facing outboard wing that projects past the lateral extension of the condylar axis of the apparatus and that has an indentation on its outside surface on the condylar axis of said apparatus.

10. The precision inspection means of claim 4 wherein said lever carries foot means at its lower end to engage said upper flat surface of the other of said index members.

11. The combination of the precision inspection means of claim 1 with a dental articulator having upper and lower frames hinged together at their posteriors by joint means permitting simulation of mandibular movements and having dental cast attachment means at the midpoint of each frame with one of said pair of mating index members secured to the upper frame by its dental cast attachment means and the other of said pair secured to the lower frame by its dental cast attachment means.

* * * * *